US009667639B1

(12) United States Patent
Pierson et al.

(10) Patent No.: US 9,667,639 B1
(45) Date of Patent: *May 30, 2017

(54) SYSTEMS AND METHODS FOR DETECTING FRAUDULENT ELECTRONIC COMMUNICATION

(71) Applicant: Viewpost IP Holdings, LLC, Maitland, FL (US)

(72) Inventors: Christopher Pierson, Lake Mary, FL (US); Hector Bermudez, Orlando, FL (US)

(73) Assignee: Viewpost IP Holdings, LLC, Maitland, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/378,519

(22) Filed: Dec. 14, 2016

Related U.S. Application Data

(63) Continuation of application No. 15/086,437, filed on Mar. 31, 2016.

(51) Int. Cl.
*G06F 21/00* (2013.01)
*H04L 29/06* (2006.01)

(52) U.S. Cl.
CPC .............................. *H04L 63/1416* (2013.01)

(58) Field of Classification Search
CPC ... H04L 51/12; H04L 12/585; H04L 63/1416; H04L 63/1441; H04L 63/145; G06F 21/554; G06F 21/56; G06F 21/60; G06Q 10/107
USPC .......................................................... 726/22
See application file for complete search history.

(56) References Cited

U.S. PATENT DOCUMENTS

| | | | |
|---|---|---|---|
| 2005/0097320 A1 | 5/2005 | Golan et al. | |
| 2007/0070921 A1 | 3/2007 | Quinlan et al. | |
| 2008/0046970 A1 | 2/2008 | Oliver et al. | |
| 2016/0057167 A1 | 2/2016 | Bach | |
| 2016/0142429 A1 | 5/2016 | Renteria | |

OTHER PUBLICATIONS

"U.S. Appl. No. 15/086,437, Non Final Office Action mailed Jul. 6, 2016", 25 pga.
"U.S. Appl. No. 15/086,437, Notice of Allowance mailed Oct. 25, 2016", 12 pgs.
"U.S. Appl. No. 15/086,437, Response filed Sep. 7, 2016 to Non Final Office Action mailed Jul. 6, 2016", 13 pgs.

*Primary Examiner* — Brian Shaw
(74) *Attorney, Agent, or Firm* — Schwegman Lundberg & Woessner, P.A.

(57) ABSTRACT

Systems and methods are presented for receiving a plurality of request messages to analyze electronic communications. For each request message of the plurality of request messages, the systems and methods further provide for analyzing header information associated with the electronic communication, generating analysis data including the header information associated with the electronic communication, sending the analysis data to a plurality of third party security information systems for analysis, receiving at least one report from each of the plurality of third party security information systems, analyzing the analysis data and the at least one report from each of the plurality of third party security information systems to generate a risk rating of the electronic communication, determining that the risk rating meets a predetermined risk rating threshold, and causing a notification to be provided indicating that the electronic communication has been analyzed.

20 Claims, 10 Drawing Sheets

FIG. 5

```
x-MS-Has-Attach:
X-MS-TNEF-Correlator:
x-originating-ip: [164.66.19.67]
x-tm-as-product-ver: SMEX-12.0.0.1031-8.000.1202-22130.005
x-tm-as-result: No-7.861400-8.000000-31
x-tm-as-user-approved-sender: No
x-tm-as-user-blocked-sender: No
Content-Type: multipart/alternative;
    boundary="_000_f9bdab7caf5240919lb1953d7722e5adoncharmitgbiz_"
MIME-Version: 1.0
X-Proofpoint-SPF-Result: pass
X-Proofpoint-SPF-Record: v=spf1 include:emailsrvr.com ~all
x-Proofpoint-Virus-Version: vendor=fsecure engine=2.50.10432:,, definitions=2016-02-14_11:,,
    signatures=0
X-Proofpoint-Spam-Details: rule=notspam policy=default score=0 spamscore=0 suspectscore=0
    malwarescore=0 phishscore=0 adultscore=0 bulkscore=1 classifier=spam
    adjust=0 reason=mlx scancount=1 engine=8.0.1-1601100000
    definitions=main-1602140236
To: Undisclosed recipients:;
Return-Path: charm4@oncharming.biz
X-MS-Exchange-Organization-AuthSource: USGAVBX04.vpcxzy.local
X-MS-Exchange-Organization-AuthAs: Internal
X-MS-Exchange-Organization-AuthMechanism: 10

-----------------------------------------

IP founds in the Message
-----------------------------------------
10.11.10.13
10.11.10.26
14.3.174.1
127.0.0.1
8.15.0.59
8.15.0.59
108.166.43.106
127.0.0.1
194.106.73.70
```

FIG. 5 (Continued)

```
184.106.73.70
0.0.0.0
172.29.129.26
172.29.129.33
15.1.229.42
154.56.19.67
12.0.0.105
---------------------------------------------------
Sender Name: Dispute Team
---------------------------------------------------
Subject: Square has withdrawn $1,780.12 from your bank account
---------------------------------------------------
Sender: charm4@soocharming.biz
---------------------------------------------------
Links found:
http://whereusement.com/
http://whereusement.com/
http://squareup.com/subscriptions/?id=qecRG1dkrYa8LOCM&se=%23%foster_legalan=email.click&r=https%3A%2F%2Fsquareup.com
http://squareup.com/subscriptions/?id=qecRG1dkrYa8LOCM&se=%23unsubscribe&r=mailto:click&r=mailto:unsubscribe.com%2Fsub
scriptions%2FpiRMRtwm%0Xie3VdN5yXG213FciH83024264t%3ecRG1dkrYa8LOCM&
http://squareup.com/subscriptions/?id=qecRG1dkrYa8LOCM&se=%13foster_jomel&n=email.click&r=http%3A%2F%2Fsquareup.com
--------------------END OF FILE--------------------
```

*FIG. 5 (Continued)*

```
Email Alert:
000000E9ACF9FA150419CC1342A797D105197D01285AADA14644BE77D01412B5AADA14644BE7
F75ACF9FA10E000377208C20000
Country's IP: JP
Geolocation ALERT!!
Alert: 0
```

SYSTEMS AND METHODS FOR DETECTING FRAUDULENT ELECTRONIC COMMUNICATION

CLAIM OF PRIORITY

This patent application claims the benefit of priority to U.S. patent application Ser. No. 15/086,437, filed Mar. 31, 2016, which is hereby incorporated by reference herein in its entirety.

TECHNICAL FIELD

The present disclosure relates generally to a mechanism for detecting fraudulent electronic communication.

BACKGROUND

Fraudulent electronic communication, such as an email or an instant message, may be used to steal personal data or information such as credit card numbers, passwords, account data, or other information, introduce a virus, or steal data from a computer or system. For example, a fraudulent electronic communication may appear as if it is sent by a trustworthy entity (e.g., a bank, social web site, credit card company, etc.). The fraudulent email communication may direct users to enter details at a fake web site that looks like a legitimate website or may contain a link that, when selected by the user, may install a virus on the user's computer. Manual analysis of suspected fraudulent electronic communication requires significant labor and is highly susceptible to human error. Moreover, with the increasing number of fraudulent electronic communications, it is not practical to manually analyze each email.

BRIEF DESCRIPTION OF THE DRAWINGS

Various ones of the appended drawings merely illustrate example embodiments of the present disclosure and should not be considered as limiting its scope.

FIG. 5 (broken into three parts) illustrates an example analysis output document, according to some example embodiments.

FIG. 6 illustrates an example report, according to some example embodiments.

DETAILED DESCRIPTION

Systems and methods described herein relate to analyzing potentially fraudulent electronic communication. In one example, a security analysis server receives a plurality of request messages to analyze potentially fraudulent electronic communications. For each request message, the security analysis server analyzes the electronic communication for actionable data and deactivates any actionable data. The security analysis server further analyzes the electronic communication to determine information associated with the electronic communication (e.g., header information, geolocation of IP addresses, information associated with links or attachments included in the electronic communication, etc.). The security analysis server generates an analysis output document with the information associated with the electronic communication and then sends the analysis output document to various security information providers for additional analysis related to viruses, spam, malware, etc. The security analysis server receives reports from the security information providers and then may perform further analysis to determine whether an electronic communication is fraudulent, or may provide the information to a security analyst for further analysis.

As explained above, manual analysis of suspected fraudulent electronic communications may require significant labor and is highly susceptible to human error. Moreover, with the increasing number of fraudulent electronic communication, it is not practical to manually analyze each email. Embodiments described herein provide for a more efficient and effective system by providing fast response time and the ability to process a high volume of electronic communications. Accordingly, the systems and methods described herein can analyze, detect, and remove harmful electronic communications quickly. Furthermore, the systems and methods can provide data and analysis indicating trends and can be used to recommend proactive solutions. In addition, the systems and methods eliminate human error, such as not fully extracting data, not properly parsing data, not processing data using relevant and applicable processes, not having the ability to include all relevant data in human-readable formatted report (e.g., such as decoding links, etc.).

Figure 1:
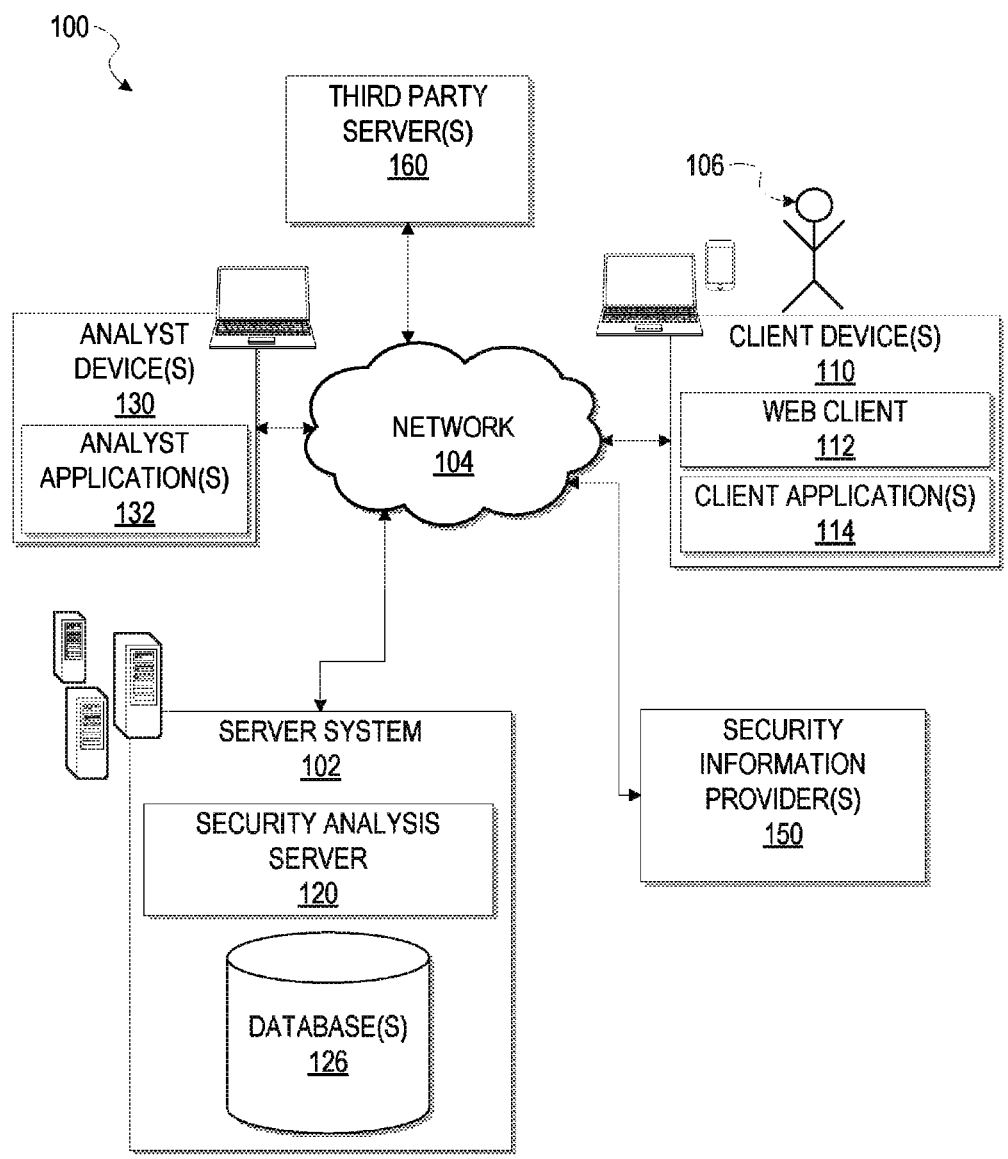
FIG. 1 is a block diagram illustrating a networked system, according to some example embodiments, configured to receive and analyze potentially fraudulent electronic communications.

FIG. 1 is a block diagram illustrating a networked system 100, according to some example embodiments, configured to receive and analyze potentially fraudulent electronic communications. The system 100 may include one or more client devices such as client device(s) 110. The client device(s) 110 may comprise, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may utilize to access the networked system 100. In some embodiments, the one or more client device(s) 110 may comprise a display module (not shown) to display information (e.g., in the form of user interfaces). In further embodiments, the client device(s) 110 may comprise one or more of touch screens, accelerometers, gyroscopes, cameras, microphones, global positioning system (GPS) devices, and so forth.

The client device(s) 110 may be a device of a user that is used to send and receive electronic communication, such as email, instant messages, etc. In one embodiment, the system 100 is an electronic communication analysis system that utilizes security data, among other data, to provide analysis related to potentially fraudulent electronic communication.

One or more users 106 may be a person, a machine, or other means of interacting with the client device(s) 110. In example embodiments, the user 106 may not be part of the system 100, but may interact with the system 100 via the client device(s) 110 or other means. For instance, the user 106 may provide input (e.g., touch screen input or alpha-numeric input) to the client device(s) 110 and the input may be communicated to other entities in the system 100 (e.g., third party server(s) 160, server system 102, etc.) via the network 104. In this instance, the other entities in the system 100, in response to receiving the input from the user 106, may communicate information to the client device(s) 110 via the network 104 to be presented to the user 106. In this way, the user 106 may interact with the various entities in the system 100 using the client device(s) 110.

The system 100 may further include a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The client device(s) 110 may access the various data and applications provided by other entities in the system 100 via web client 112 (e.g., a browser, such as the Internet Explorer® browser developed by Microsoft® Corporation of Redmond, Wash. State) or one or more client applications 114. The client device(s) 110 may include one or more client applications 114 (also referred to as "apps") such as, but not limited to, a web browser, messaging application, electronic mail (email) application, a social networking application, an e-commerce site application, a mapping or location application, and the like. In some embodiments, one or more client applications 114 may be included in a given client device 110, and configured to locally provide the user interface and at least some of the application functionalities. The client application(s) 114 are configured to communicate with other entities in the system 100 (e.g., analyst device(s) 130, third party server(s) 160, server system 102, etc.), on an as-needed basis, for data and/or processing capabilities not locally available (e.g., sending and receiving electronic communication, accessing electronic communication, analysis of potentially fraudulent electronic communication, to authenticate a user 106, to verify a method of payment, etc.). Conversely, one or more client applications 114 may not be included in the client device(s) 110, and then the client device(s) 110 may use its web browser to access the one or more client applications 114 hosted on other entities in the system 100 (e.g., third party server(s) 160, server system 102, etc.).

A server system 102 may provide server-side functionality via the network 104 (e.g., the Internet or wide area network (WAN)) to one or more third party servers 160, one or more analyst device(s) 130, and/or one or more client devices 110. The server system 102 includes a security analysis server 120, which is communicatively coupled with one or more databases 126. Database(s) 126 may be storage devices that store information such as documents including information generated from analysis of electronic communication, reports from security information provider(s) 150, etc.

The security analysis server 120 may provide functionality to perform various analysis of potentially fraudulent electronic communications. The security analysis server 120 may access one or more databases 126 to retrieve stored data to use in analysis and to store results of analysis.

The system 100 includes one or more security information provider(s) 150. The one or more security information provider(s) 150 may be third party services that are separate entities from the server system 102 or may be associated with the same entity as server system 102 (or both). The one or more security information provider(s) 150 may analyze data (e.g., an analysis output document, etc.) received from the server system 102, and provide reports relating to the analysis to the server system 102. For example, a security information provider 150 may be an antivirus scanning engine that analyzes data in the analysis output document for any known viruses. The report provided from the security information provider 150 may include any warnings or alerts related to viruses associated with data in the analysis output document.

The system 100 includes one or more third party servers 160. The one or more third party server(s) 160 may be electronic communication server(s) configured to send and receive electronic communication. Examples of electronic communication may include email, instant messages (e.g., AOL Instant Messenger, Facebook Chat, Google Talk, ICQ, Windows Live Messenger, Yahoo Messenger, etc.), Short Message Service (SMS), Multimedia Messaging Service (MMS), etc. Some examples of electronic communication servers include Post Office Protocol 3 (POP3), Internet Message Access Protocol (IMAP), Simple Message Transfer Protocol (SMTP), Microsoft Exchange Server, Short Message Service Center (SMSC), etc. The one or more third party server(s) 160 may be associated with one or more analyst devices(s) 130 or client device(s) 110. For example, the one or more third party server(s) 160 may send electronic communication to and receive electronic communication from one or more analyst device(s) 130 and/or one or more client device(s) 110. The one or more third party servers 160 may interact with the server system 102 via security analysis server 120. For example, the third party server(s) 160 may send electronic communication to and receive electronic communication from server system 102.

The system 100 further includes one or more analyst device(s) 130. The analyst device(s) 130 may be a device of a user, such as a security analyst, that is used to send and receive electronic communication, analyze electronic communication, receive analysis and reports associated with electronic communication, etc. The analyst device(s) 130 may comprise, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may utilize to access the networked system 100. In some embodiments, the one or more analyst device(s) 130 may comprise a display module (not shown) to display information (e.g., in the form of user interfaces). In further embodiments, the analyst device(s) 130 may comprise one or more of touch screens, accelerometers, gyroscopes, cameras, microphones, global positioning system (GPS) devices, and so forth.

The analyst device(s) 130 may access the various data and applications provided by other entities in the system 100 via one or more analyst application(s) 132. The one or more analyst applications 132 (also referred to as "apps") may include, but are not limited to, a web browser, a security application, a messaging application, an electronic mail (email) application, a social networking application, an e-commerce site application, and the like. In some embodiments, one or more analyst applications 132 may be included in a given one of the analyst device(s) 130, and configured to locally provide the user interface and at least some of the application functionalities. The analyst application(s) 132 are configured to communicate with other entities in the system 100 (e.g., client device(s) 110, third party server(s) 160, server system 102, etc.), on an as-needed basis, for data and/or processing capabilities not locally available (e.g., sending and receiving electronic communication, accessing electronic communication, analysis of potentially fraudulent electronic communication, to authenticate a user 106, to verify a method of payment, etc.). Conversely, one or more analyst applications 132 may not be included in the analyst device(s) 130, and then the analyst device(s) 130 may use its web browser to access the one or more analyst application(s) 132 hosted on other entities in the system 100 (e.g., third party server(s) 160, server system 102, etc.).

A user 106 may receive various electronic communications throughout the day. For example, the user 106 may receive work-related emails, personal emails, text messages, instant messages, and other forms of electronic communication via one or more client device(s) 110. An electronic communication received by the user 106 may be a valid electronic communication from known sender, or may be electronic communications laden with malware, viruses, etc. An electronic communication may include one or more attachments.

Electronic communication that is potentially fraudulent may be sent to server system 102 for analysis. In one example, a user 106 himself may send the potentially fraudulent electronic communication to server system 102 by forwarding the message to a particular message address (e.g., email address, phone number, etc.). In another example, the user 106 may have an option within a client application 114 (e.g., an email application, text message application, social network application, instant message application, etc.) to select for the message to be analyzed (e.g., via drop down menu item, predetermined finger swipe, designated button, etc.). The message may then be forwarded to the server system 102.

In another example, the potentially fraudulent electronic communication is sent automatically from the one or more client device(s) 110 to the server system 102 before the user 106 receives it, or in parallel to the user 106 receiving it. In yet another example, the potentially fraudulent electronic communication is sent automatically from a server (e.g., third party server(s) 160) associated with the client device(s) 110 upon receiving the electronic communication and before, or at substantially the same time as, the electronic communication message is provided to the user 106. In a further example, the electronic communication may be moved or sent to a deleted items folder until the electronic communication is analyzed by server system 102.

Once the server system 102 receives the request message, the request message may be automatically analyzed or it may be provided to an analyst device(s) 130 so that a security analyst may review and send the request message to server system 102. The security analyst may send the request message individually or may send a batch of request messages to server system 102.

Figure 4:
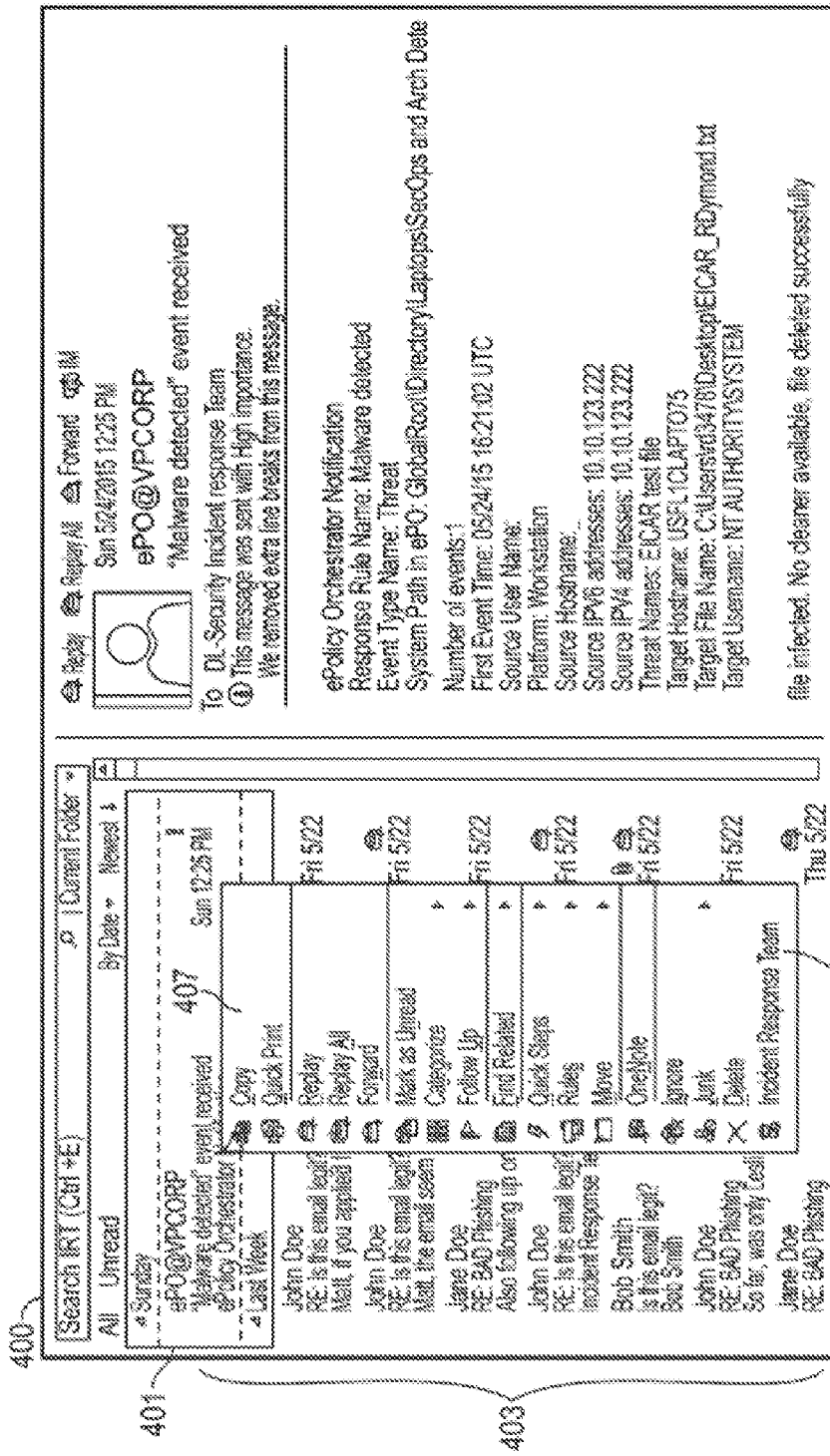
FIG. 4 illustrates an example interface, according to some example embodiments.

In one example, the security analyst may send the potentially fraudulent electronic communication to server system 102 by forwarding the message to a particular message address (e.g., email address, phone number, etc.). In another example, the security analyst may have an option within an analyst application(s) 132 (e.g., security analysis application, an email application, text message application, social network application, instant message application, etc.) to select for the message to be analyzed (e.g., via drop down menu item, predetermined finger swipe, designated button, etc.). FIG. 4 shows one example interface 400 that allows a security analyst to review and select one or more electronic communications 403 to be sent to the server system 102. For example, the security analyst may select an electronic communication 401, and be provided with a drop down menu list 407 when the security analyst right clicks on the selected electronic communication 401. The drop down menu list 407 provides the security analyst with a mechanism for sending the selected electronic communication 401 to the server system 102, via the menu item 409.

Figure 2:
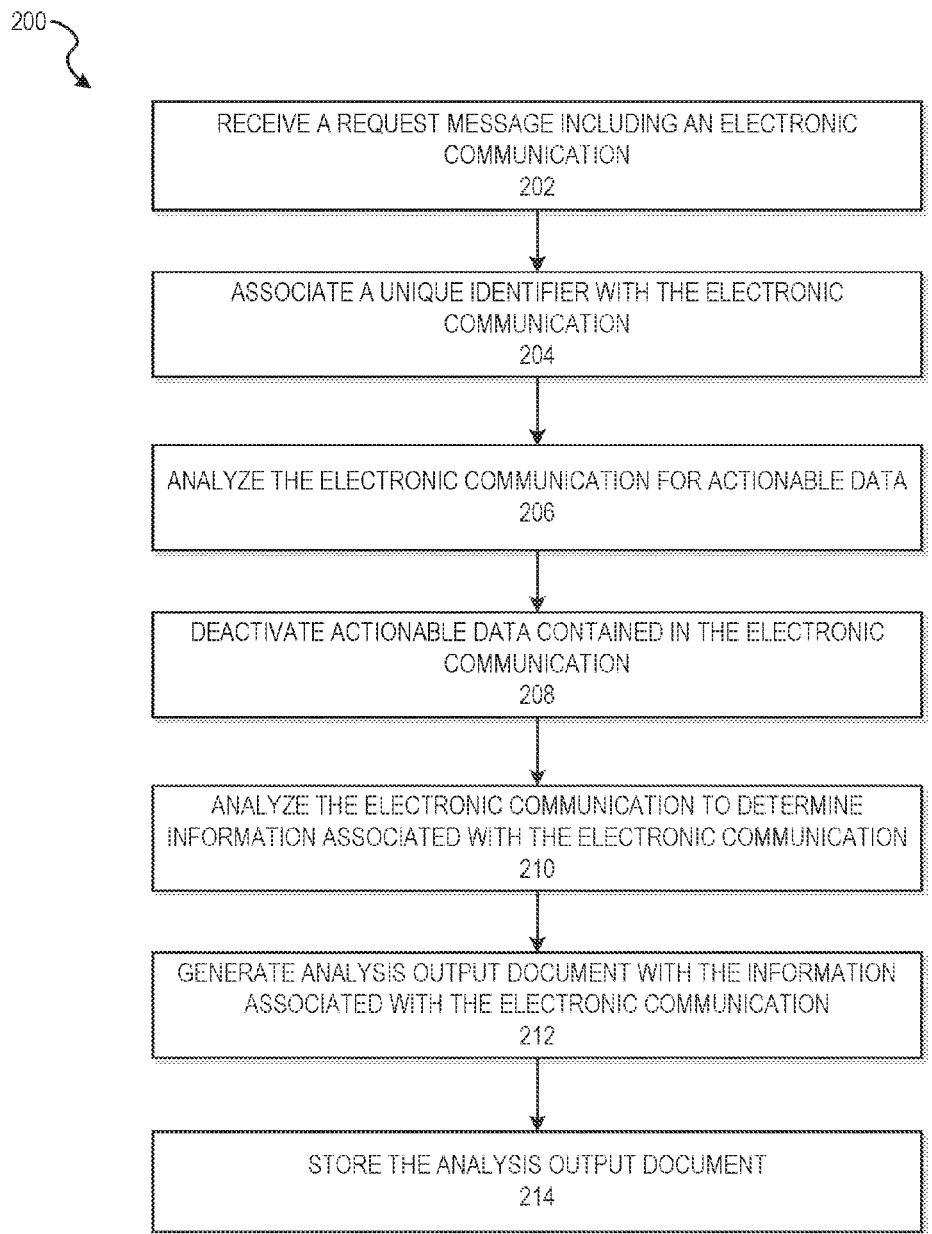
FIG. 2 is a flowchart illustrating aspects of a method, according to some example embodiments for receiving and analyzing electronic communication.

FIG. 2 is a flow chart illustrating aspects of a method 200, according to some example embodiments, for receiving and analyzing electronic communications. For illustrative purposes, method 200 is described with respect to the networked system 100 of FIG. 1. It is to be understood that method 200 may be practiced with other system configurations in other embodiments.

The server system 102 may receive a plurality of request messages which request analysis of potentially fraudulent electronic communication messages. For example, the server system 102 may receive request messages via client device(s) 110, third party server(s) 160, analyst device(s) 130, etc. Each request message may comprise an electronic communication. The server system 102 may receive the plurality of request messages and perform a number of operations for each request message (e.g., via security analysis server 120).

At operation 202, the security analysis server 120 receives a request message including an electronic communication. At operation 204, the security analysis server 120 associates a unique identifier number with the electronic communication. The security server 120 may create a data repository associated with the unique identifier number. The data repository may reside in database(s) 126 and/or on an analyst device 130. The data repository may be accessible by a security analyst (e.g., using an analyst device 130).

At operation 206, the security analysis server 120 analyzes the electronic communication for actionable data. Analyzing the electronic communication for actionable data may include analyzing any attachments associated with the electronic communication for actionable data. Actionable data is data with which a user or a system can interact and which will cause an action to occur. For example, actionable data may include a link (e.g., a web address or URL). When a user 106 selects the link, an action may occur such as launching a program, opening a file, collecting data from the user's device, etc. Other examples of actionable data include an executable program file, a macro virus file, etc. For example, the electronic communication and/or any attachment associated with the electronic communication may contain one more links or an executable file (or the attachment itself may be an executable file). If the security analysis server 120 determines the electronic communication includes actionable data, the security analysis server 120 deactivates the actionable data, at operation 208, so that it can no longer be activated.

At operation 210, the security analysis server 120 analyzes the electronic communication to determine information associated with the electronic communication. In one example, the security analysis server 120 analyzes the electronic communication to determine header information associated with the electronic communication. The security analysis server 120 may then analyze the header information to determine various information associated with the electronic communication, including at least one Internet Protocol (IP) address. For example, header information may include sender information (e.g., a sender's name and/or address), one or more recipient's information (e.g., recipient name and address), a sent date and time of the electronic communication (e.g., a sent timestamp and a received timestamp), a subject (e.g., a subject of the message specified by a user 106), etc.

Header information may further contain routing information. A given electronic communication may be routed between one or more computer systems (e.g., third party server(s) 160) before a user ultimately receives the electronic communication. The header information may contain routing information such as one or more IP addresses that may identify one or more computer systems through which the electronic communication passed. Some or all of the header information may not be visible to the user. For example, the user may not be able to see the list of IP addresses for where the electronic communication was routed. Header information may further include a sent and received timestamp for intermediate computing systems.

In another example, the security analysis server 120 may analyze the electronic communication (including any attachment associated with the electronic communication) to determine at least one link in the electronic communication. The security analysis server 120 may parse the at least one link. The parsing the at least one link in the electronic communication may comprise decoding the at least one link. For example, before providing an electronic communication to a user 106, any links in the electronic communication may be encoded (e.g., to take the link, such as a website address, and turn it into a very long and hard to decrypt message). The security analysis server 120 may decode the link to be in an easily readable format for analysis.

Figure 5:
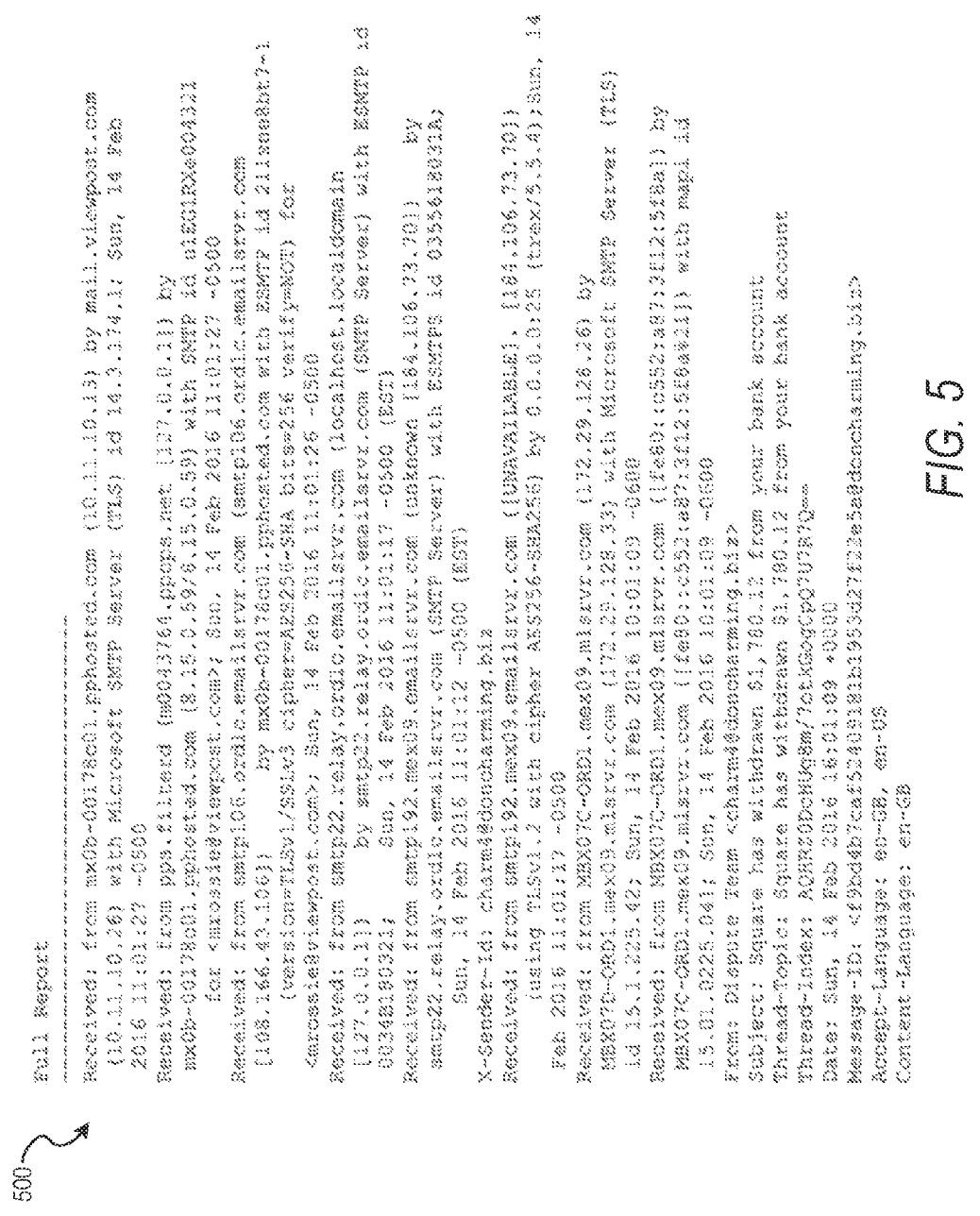

At operation 212, the security analysis server 120 generates an analysis output document associated with the electronic communication. For example, the analysis output document may include the header information associated with the electronic communication, at least one IP address, at least one parsed link, etc. The security analysis server 120 stores the analysis output document at operation 214, in the data repository associated with the unique identification number. An example analysis output document 500 is shown in FIG. 5 (broken into three parts). The analysis output document may be customized to include information and to be in a format determined by a security analyst.

Figure 3:
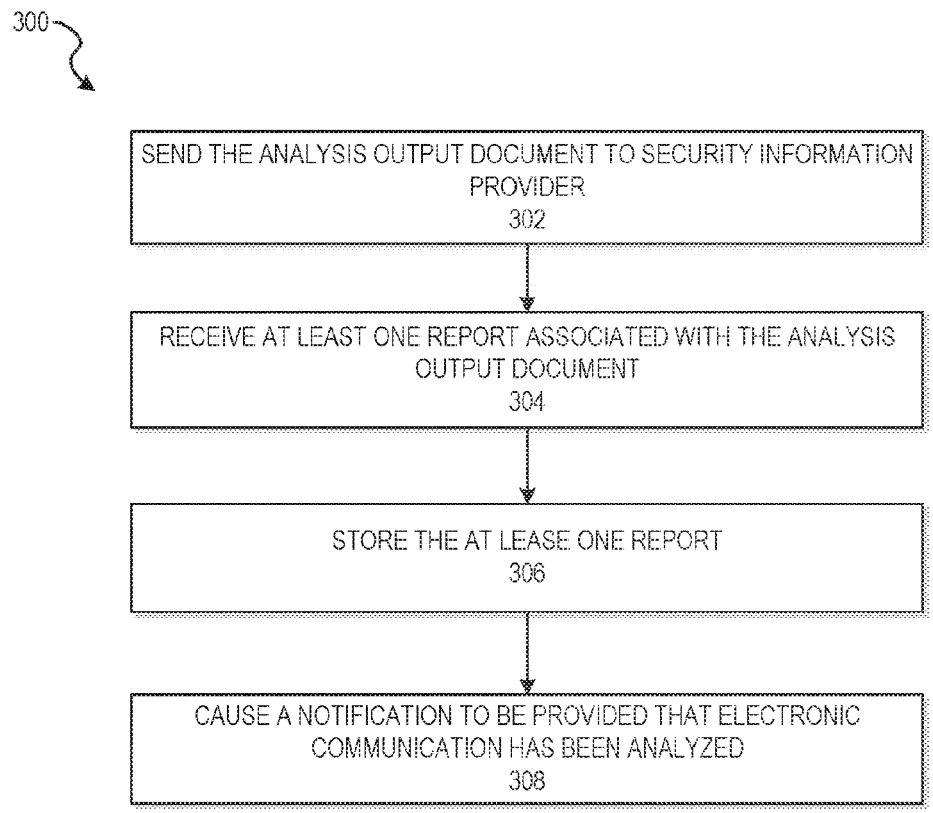
FIG. 3 is a flowchart illustrating aspects of a method, according to some example embodiments, for analyzing analysis output documents via a security information provider.

FIG. 3 is a flow chart illustrating aspects of a method 300, according to some example embodiments, for analyzing analysis output documents via a security information provider. For illustrative purposes, method 300 is described with respect to the networked system 100 of FIG. 1. It is to be understood that method 300 may be practiced with other system configurations in other embodiments.

At operation 302, the security analysis server 120 sends the analysis output document to one or more security information provider(s) 150. As described above, each security information provider 150 may analyze the data in the analysis output document for any viruses, malware, phishing schemes, or other mechanisms to compromise a user's system or gain personal information from a user. The security information provider 150 may generate a report based on the analysis. For example, the report may include any warnings or alerts related to potential viruses, malware, spam, IP addresses associated with command and control, IP addresses indicating a compromised electronic communication, irregular geolocation, key words, phrases, etc. An example report is shown in FIG. 6. The security information provider 150 sends the report to the security analysis server 120.

At operation 304, the security analysis server 120 receives the at least one report associated with the analysis output document. The security analysis server 120 stores the at least one report at operation 306.

The security analysis server 120 may conduct further analysis utilizing the analysis output document and/or one or more reports from security information providers 150. For example, the security analysis server 120 may analyze the analysis output document and the at least one report for any information that may indicate that the electronic communication is fraudulent.

In one example, the security analysis server 120 may analyze the IP addresses in the analysis output document to determine the geolocation for each IP address. The geolocation may be used to determine whether the electronic communication is fraudulent. For instance, there may be certain locations that are considered risky to be sending or receiving electronic communications. Or based on the sender geolocation and receiving geolocation, the security analysis server 120 may determine the electronic communication is fraudulent because, for example, it does not make sense for an electronic communication that was sent and received in the U.S. to be routed through China or Russia. The security analysis server 120 may generate a report with the geolocation information and/or any analysis of risk of the geolocation information. The report may be stored in the data repository associated with the unique identifier number.

In another example, the security analysis server 120 may analyze any links in the analysis output document to determine whether the text of the link actually matches the destination of the link. For example, the parsed text of the link may be "www.myfavoritestore.com", but the destination associated with the link (e.g., where the link will take a user once the user selects the link) may be "www.viruscentral.com". The security analysis server 120 may generate a report with the destination and/or analysis of the destination. The report may be stored in the data repository associated with the unique identifier number.

In another example, the security analysis server 120 may generate a risk rating based on the analysis output document and/or the one or more reports from security information provider(s) 150. For example, each suspicious characteristic of the electronic communication may be scored from one to ten. For example, a link text that does not match a destination gets a score, suspicious geolocations get a score, certain keywords get a score, etc. The scores are then used to generate an overall risk rating. The risk rating may be stored in the data repository associated with the unique identifier. The security analysis server 120 may analyze the risk rating to determine whether it meets a predetermined risk rating threshold (e.g., an eight out of ten or greater). If the security analysis server 120 determines that it meets a risk rating threshold, it may cause the electronic communication to be automatically deleted from a client device 110 that originally received the electronic communication. Or the security analysis server 120 may cause the electronic communication to be automatically deleted before it ever reaches the client device 110. In one example, the electronic communication may be added to a spam filter associated with the client device 110 such that future similar electronic communication may be detected.

In another example, the security analysis server 120 may analyze one or more reports from one or more security information provider(s) 150 to determine whether the electronic communication is fraudulent. If the analysis server 120 determines that the electronic communication is fraudulent, it may cause the electronic communication to be automatically deleted from a client device 110 that originally received the electronic communication. Or the security analysis server 120 may cause the electronic communication to be automatically deleted before it ever reaches the client device 110. In one example, the electronic communication may be added to a spam filter associated with the client device 110 such that future similar electronic communication may be detected.

At operation 308, the security analysis server 120 causes a notification to be provided indicating that the electronic communication has been analyzed. For example, the security analysis server 120 may send a notification to a client device 110 and the notification may be displayed to a user on the client device 110.

Figure 7:
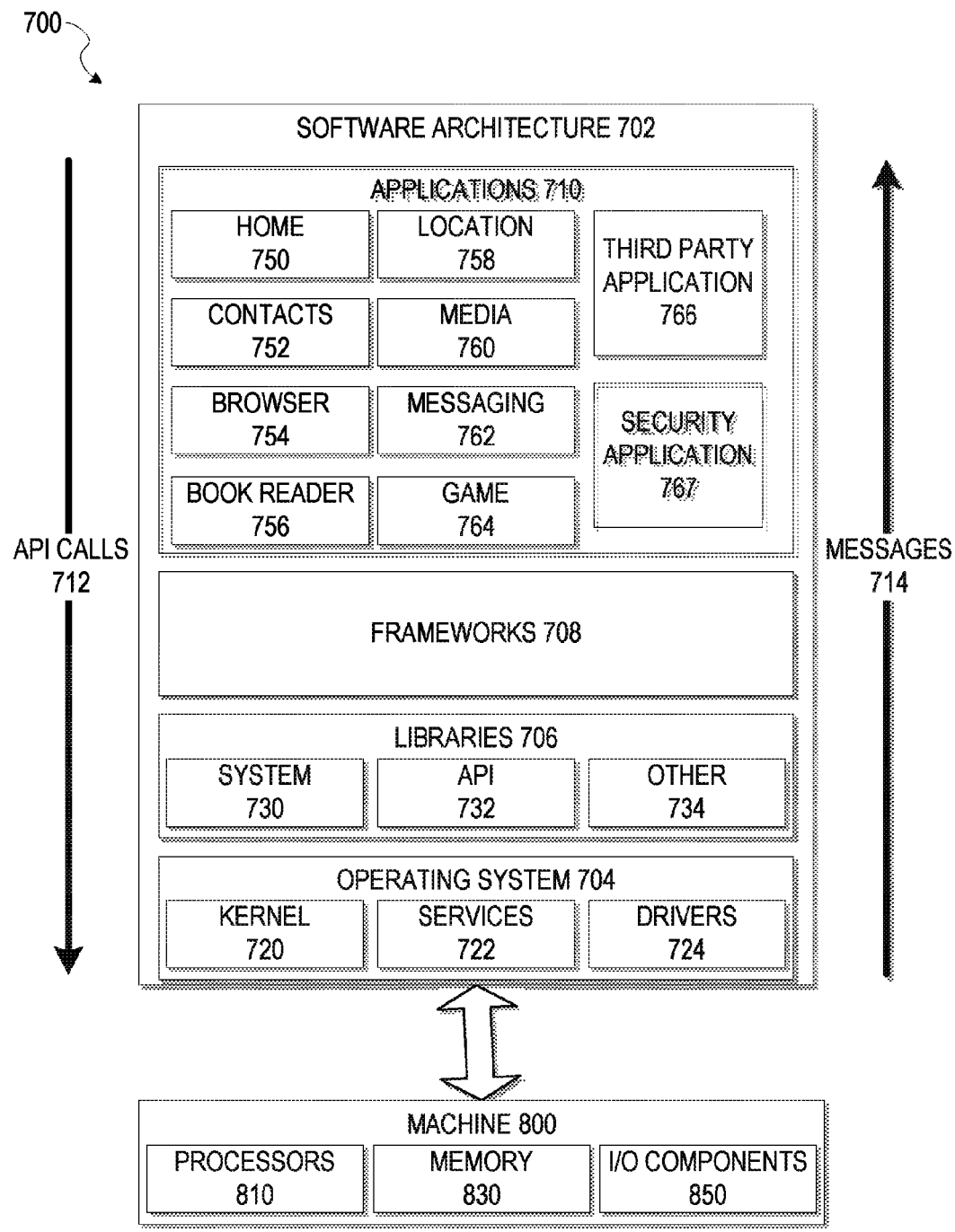
FIG. 7 is a block diagram illustrating an example of a software architecture that may be installed on a machine, according to some example embodiments, configured to receive and analyze potentially fraudulent electronic communications.

FIG. 7 is a block diagram 700 illustrating software architecture 702, which can be installed on any one or more of the devices described above. For example, in various embodiments, client devices 110, analyst device(s) 130, and server systems 102, 120, 150, and 160 may be implemented using some or all of the elements of software architecture 702. FIG. 7 is merely a non-limiting example of a software architecture, and it will be appreciated that many other architectures can be implemented to facilitate the functionality described herein. In various embodiments, the software architecture 702 is implemented by hardware such as machine 800 of FIG. 8 that includes processors 810, memory 830, and I/O components 850. In this example, the software architecture 702 can be conceptualized as a stack of layers where each layer may provide a particular functionality. For example, the software architecture 702 includes layers such as an operating system 704, libraries 706, frameworks 708, and applications 710. Operationally, the applications 710 invoke application programming interface (API) calls 712 through the software stack and receive messages 714 in response to the API calls 712, consistent with some embodiments.

In various implementations, the operating system 704 manages hardware resources and provides common services. The operating system 704 includes, for example, a kernel 720, services 722, and drivers 724. The kernel 720 acts as an abstraction layer between the hardware and the other software layers, consistent with some embodiments. For example, the kernel 720 provides memory management, processor management (e.g., scheduling), component management, networking, and security settings, among other functionality. The services 722 can provide other common services for the other software layers. The drivers 724 are responsible for controlling or interfacing with the underlying hardware, according to some embodiments. For instance, the drivers 724 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 706 provide a low-level common infrastructure utilized by the applications 710. The libraries 706 can include system libraries 730 (e.g., C standard library) that can provide functions such as memory allocation functions, string manipulation functions, mathematic functions, and the like. In addition, the libraries 706 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in graphic content on a display), database libraries (e.g., SQLite to provide various relational database functions), web libraries (e.g., WebKit to provide web browsing functionality), and the like. The libraries 706 can also include a wide variety of other libraries 734 to provide many other APIs to the applications 710.

The frameworks 708 provide a high-level common infrastructure that can be utilized by the applications 710, according to some embodiments. For example, the frameworks 708 provide various graphic user interface (GUI) functions, high-level resource management, high-level location services, and so forth. The frameworks 708 can provide a broad spectrum of other APIs that can be utilized by the applications 710, some of which may be specific to a particular operating system 704 or platform.

In an example embodiment, the applications 710 include a home application 750, a contacts application 752, a browser application 754, a book reader application 756, a location application 758, a media application 760, a messaging application 762, a game application 764, and a broad assortment of other applications, such as a third party applications 766. According to some embodiments, the applications 710 are programs that execute functions defined in the programs. Various programming languages can be employed to create one or more of the applications 710, structured in a variety of manners, such as object-oriented programming languages (e.g., Objective-C, Java, or C++) or procedural programming languages (e.g., C or assembly language). In a specific example, the third party application 766 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third party application 766 can invoke the API calls 712 provided by the operating system 704 to facilitate functionality described herein.

Some embodiments may particularly include a security application 767. In certain embodiments, this may be a stand-alone application that operates to manage communications with a server system such as third party server(s) 160 or server system 102. In other embodiments, this functionality may be integrated with another application such as an email or messaging application or another such application. Security application 767 may facilitate sending and receiving request messages to analyze potentially fraudulent electronic communications and provide the capability for a user to input data related to electronic communications via a touch interface, keyboard, or other mechanism of machine 800, communication with a server system via I/O components 850, and receipt and storage of analysis data in memory 830. Functionality related to request messages to analyze potentially fraudulent electronic communications can be managed by security application 767 using different frameworks 708, libraries 706 elements, or operating system 704 elements operating on a machine 800.

Figure 8:
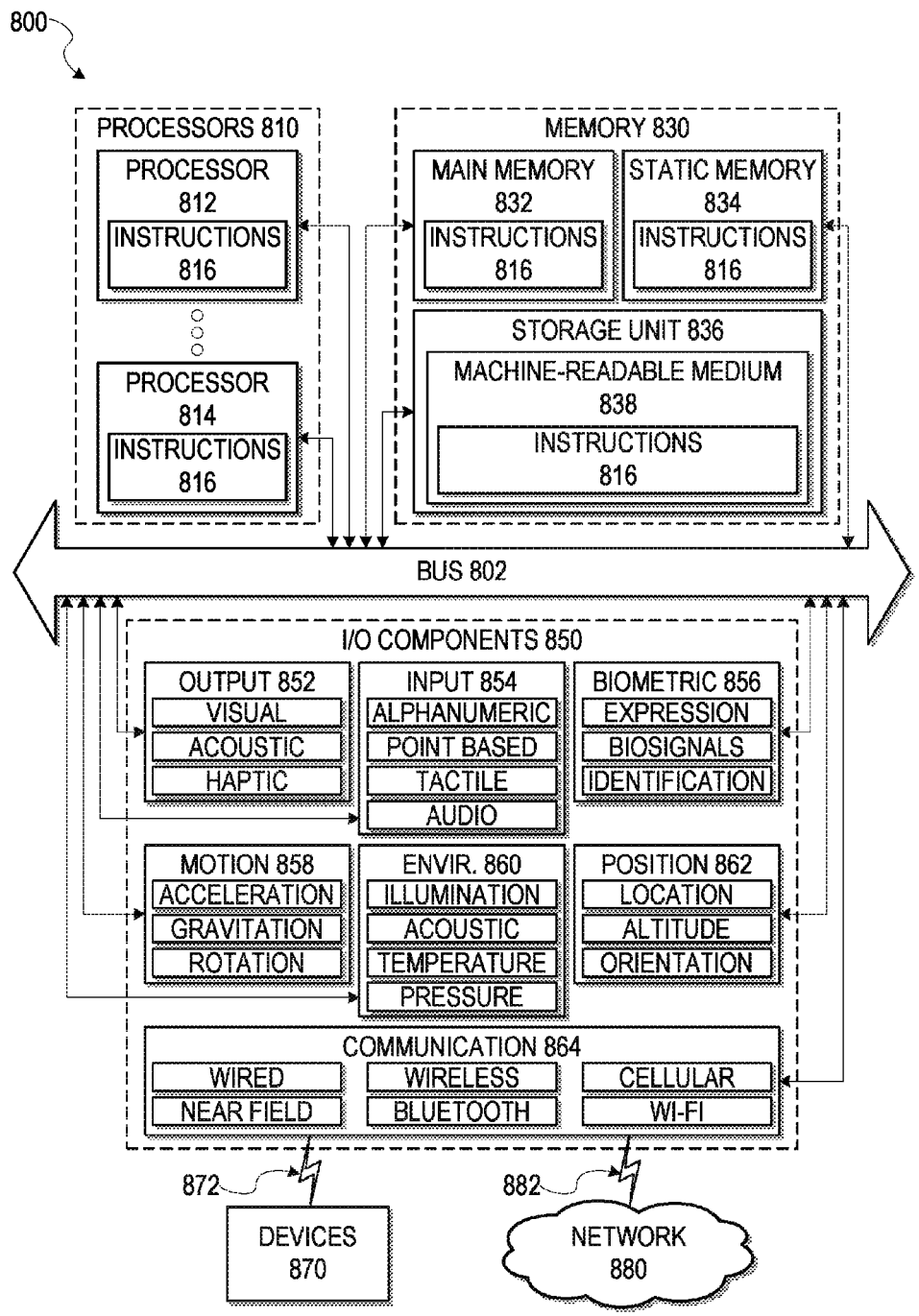
FIG. 8 illustrates a diagrammatic representation of a machine, in the form of a computer system, within which a set of instructions may be executed for causing the machine to perform any one or more of the methodologies discussed herein, according to an example embodiment.

FIG. 8 is a block diagram illustrating components of a machine 800, according to some embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 816 (e.g., software, a program, an application 710, an applet, an app, or other executable code) for causing the machine 800 to perform any one or more of the methodologies discussed herein can be executed. In alternative embodiments, the machine 800 operates as a standalone device or can be coupled (e.g., networked) to other machines. In a networked deployment, the machine 800 may operate in the capacity of a server machine 102, 120, 150, 160, etc., or a client device 110 or analyst device 130 in a server-client network environment, or as a peer machine in a peer-to-peer (or distributed) network environment. The machine 800 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

In various embodiments, the machine 800 comprises processors 810, memory 830, and I/O components 850, which can be configured to communicate with each other via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 812 and a processor 814 that may execute the instructions 816. The term "processor" is intended to include multi-core processors 810 that may comprise two or more independent processors 812, 814 (also referred to as "cores") that can execute instructions 816 contemporaneously. Although FIG. 8 shows multiple processors 810, the machine 800 may include a single processor 810 with a single core, a single processor 810 with multiple cores (e.g., a multi-core processor 810), multiple processors 812, 814 with a single core, multiple processors 810, 812 with multiples cores, or any combination thereof.

The memory 830 comprises a main memory 832, a static memory 834, and a storage unit 836 accessible to the processors 810 via the bus 802, according to some embodiments. The storage unit 836 can include a machine-readable medium 838 on which are stored the instructions 816 embodying any one or more of the methodologies or functions described herein. The instructions 816 can also reside, completely or at least partially, within the main memory 832, within the static memory 834, within at least one of the processors 810 (e.g., within the processor's cache memory), or any suitable combination thereof, during execution thereof by the machine 800. Accordingly, in various embodiments, the main memory 832, the static memory 834, and the processors 810 are considered machine-readable media 838.

As used herein, the term "memory" refers to a machine-readable medium 838 able to store data temporarily or permanently and may be taken to include, but not be limited to, random-access memory (RAM), read-only memory (ROM), buffer memory, flash memory, and cache memory. While the machine-readable medium 838 is shown, in an example embodiment, to be a single medium, the term "machine-readable medium" should be taken to include a single medium or multiple media (e.g., a centralized or distributed database, or associated caches and servers) able to store the instructions 816. The term "machine-readable medium" shall also be taken to include any medium, or combination of multiple media, that is capable of storing instructions (e.g., instructions 816) for execution by a machine (e.g., machine 800), such that the instructions 816, when executed by one or more processors of the machine 800 (e.g., processors 810), cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 850 include a wide variety of components to receive input, provide output, produce output, transmit information, exchange information, capture measurements, and so on. In general, it will be appreciated that the I/O components 850 can include many other components that are not shown in FIG. 8. The I/O components 850 are grouped according to functionality merely for simplifying the following discussion, and the grouping is in no way limiting. In various example embodiments, the I/O components 850 include output components 852 and input components 854. The output components 852 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 854 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 850 include biometric components 856, motion components 858, environmental components 860, or position components 862, among a wide array of other components. For example, the biometric components 856 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 858 include acceleration sensor components (e.g., accelerometer), gravitation sensor components, rotation sensor components (e.g., gyroscope), and so forth. The environmental components 860 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 862 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 850 may include communication components 864 operable to couple the machine 800 to a network 880 or devices 870 via a coupling 882 and a coupling 872, respectively. For example, the communication components 864 include a network interface component or another suitable device to interface with the network 880. In further examples, communication components 864 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 870 may be another machine 800 or any of a wide variety of peripheral devices (e.g., a peripheral device coupled via a Universal Serial Bus (USB)).

Moreover, in some embodiments, the communication components 864 detect identifiers or include components operable to detect identifiers. For example, the communication components 864 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 864, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 880 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 816 are transmitted or received over the network 880 using a transmission medium via a network interface device (e.g., a network interface component included in the communication components 864) and utilizing any one of a number of well-known transfer protocols (e.g., Hypertext Transfer Protocol (HTTP)). Similarly, in other example embodiments, the instructions 816 are transmitted or received using a transmission medium via the coupling 872 (e.g., a peer-to-peer coupling) to the devices 870. The term "transmission medium" shall be taken to include any intangible medium that is capable of storing, encoding, or carrying the instructions 816 for execution by the machine 800, and includes digital or analog communications signals or other intangible media to facilitate communication of such software.

Furthermore, the machine-readable medium 838 is non-transitory (in other words, not having any transitory signals) in that it does not embody a propagating signal. However, labeling the machine-readable medium 838 "non-transitory" should not be construed to mean that the medium 838 is incapable of movement; the medium 838 should be considered as being transportable from one physical location to another. Additionally, since the machine-readable medium 838 is tangible, the medium 838 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
receiving, at a server computer, a plurality of request messages to analyze electronic communications, each request message of the plurality of request messages comprising an electronic communication; and
for each request message of the plurality of request messages:
analyzing header information associated with the electronic communication;
generating, by the server computer, analysis data including the header information associated with the electronic communication;
sending, by the server computer, the analysis data to a plurality of third party security information systems for analysis;
receiving, by the server computer, at least one report from each of the plurality of third party security information systems, wherein each report from each of the plurality of third party security information systems comprises warning data associated with the analysis data;
analyzing, by the server computer, the analysis data and the at least one report from each of the plurality of third party security information systems to generate a risk rating of the electronic communication;
determining, by the server computer, that the risk rating meets a predetermined risk rating threshold; and
causing, by the server computer, a notification to be provided indicating that the electronic communication has been analyzed.

2. The method of claim 1, further comprising:
analyzing, by the server computer, the electronic communication to determine that the electronic communication contains actionable data and deactivating the actionable data,
wherein actionable data includes a link or an executable file.

3. The method of claim 1, wherein the electronic communication includes an attachment to the electronic communication, and wherein analyzing the electronic communication further comprises:
analyzing the attachment to the electronic communication to determine that the electronic communication contains actionable data and deactivating the actionable data.

4. The method of claim 1, further comprising:
analyzing, by the server computer, the electronic communication to determine at least one link in the electronic communication;
parsing, by the server computer, the at least one link; and
storing the at least one parsed link in the analysis data.

5. The method of claim 4, wherein parsing the at least one link in the electronic communication further comprises decoding the at least one link.

6. The method of claim 4 further comprising:
analyzing the at least one link to determine whether text of the link matches the destination of the link.

7. The method of claim 1, wherein analyzing the electronic communication to determine the header information includes determining at least one of a group comprising: at least one IP address, sender information, recipient information, subject, sent timestamp, received timestamp, and a sent and received timestamp of each intermediate electronic communication senders.

8. The method of claim 1, wherein the server computer is a first server computer, and wherein the plurality of request messages are sent in bulk from a second server computer automatically after receiving them from one or more client devices.

9. The method of claim 1, wherein the plurality of request messages are sent by an analyst device.

10. The method of claim 1, further comprising:
associating, by the server computer, a unique identification number with the electronic communication;
storing, by the server computer, the analysis data in a data repository associated with the unique identification number;
storing, by the server computer, the at least one report from each of the plurality of third party security information providers in the data repository associated with the unique identifier; and
storing, by the server computer, the risk rating in the data repository associated with the unique identifier.

11. The method of claim 10, further comprising:
causing the electronic communication to be automatically deleted from a client device that originally received the electronic communication, based on determining that the risk rating meets the predetermined risk rating threshold.

12. The method of claim 1, further comprising:
analyzing the at least one report from each of the plurality of third party security information providers to determine that the electronic communication is fraudulent; and
causing the electronic communication to be automatically deleted from a client device that originally received the electronic communication, based on determining that the electronic communication is fraudulent.

13. The method of claim 1, wherein analyzing the header information comprises determining at least one IP address in the header information, and the method further comprises:
  analyzing the at least one IP address to determine a geolocation; and
  determining if the geolocation is a high risk geolocation.

14. The method of claim 1, wherein generating a risk rating comprises scoring each suspicious characteristic of the electronic communication and generating the risk rating based on the scores for each suspicious characteristic.

15. The method of claim 1, wherein the warning data comprises a warning related to potential viruses, malware, spam, IP addresses associated with command and control, IP addresses indicating a compromised electronic communication, irregular geolocation, key word, or key phrase.

16. A server computer comprising:
  a processor; and
  a computer-readable medium coupled with the processor, the computer-readable medium comprising instructions stored thereon that are executable by the processor to cause a computing device to perform operations comprising:
    receiving a plurality of request messages to analyze electronic communications, each request message of the plurality of request messages comprising an electronic communication; and
    for each request message of the plurality of request messages:
      analyzing header information associated with the electronic communication;
      generating analysis data including the header information associated with the electronic communication;
      sending the analysis data to a plurality of third party security information systems for analysis;
      receiving at least one report from each of the plurality of third party security information systems, wherein each report from each of the plurality of third party security information systems comprises warning data associated with the analysis data;
      analyzing the analysis data and the at least one report from each of the plurality of third party security information systems to generate a risk rating of the electronic communication;
      determining that the risk rating meets a predetermined risk rating threshold; and
      causing a notification to be provided indicating that the electronic communication has been analyzed.

17. The server computer of claim 16, the operations further comprising:
  associating a unique identification number with the electronic communication;
  storing the analysis data in a data repository associated with the unique identification number;
  storing the at least one report from each of the plurality of third party security information providers in the data repository associated with the unique identifier; and
  storing the risk rating in the data repository associated with the unique identifier.

18. The server computer of claim 16, the operations further comprising:
  causing the electronic communication to be automatically deleted from a client device that originally received the electronic communication, based on determining that the risk rating meets the predetermined risk rating threshold.

19. The server computer of claim 16, the operations further comprising:
  analyzing the at least one report from each of the plurality of third party security information providers to determine that the electronic communication is fraudulent; and
  causing the electronic communication to be automatically deleted from a client device that originally received the electronic communication, based on determining that the electronic communication is fraudulent.

20. A non-transitory computer-readable medium comprising instructions stored thereon that are executable by at least one processor to cause a computing device to perform operations comprising:
  receiving a plurality of request messages to analyze electronic communications, each request message of the plurality of request messages comprising an electronic communication; and
  for each request message of the plurality of request messages:
    analyzing header information associated with the electronic communication;
    generating analysis data including the header information associated with the electronic communication;
    sending the analysis data to a plurality of third party security information systems for analysis;
    receiving at least one report from each of the plurality of third party security information systems, wherein each report from each of the plurality of third party security information systems comprises warning data associated with the analysis data;
    analyzing the analysis data and the at least one report from each of the plurality of third party security information systems to generate a risk rating of the electronic communication;
    determining that the risk rating meets a predetermined risk rating threshold; and
    causing a notification to be provided indicating that the electronic communication has been analyzed.

\* \* \* \* \*